United States Patent
Zhao et al.

(10) Patent No.: US 10,708,344 B1
(45) Date of Patent: Jul. 7, 2020

(54) CONTINUOUS PERFORMANCE MANAGEMENT IN INFORMATION PROCESSING SYSTEMS

(71) Applicant: EMC Corporation, Hopkinton, MA (US)

(72) Inventors: Junping Zhao, Beijing (CN); Yu Cao, Beijing (CN); Sanping Li, Beijing (CN); Kenneth Durazzo, San Ramon, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 185 days.

(21) Appl. No.: 14/978,444

(22) Filed: Dec. 22, 2015

(51) Int. Cl.
*G06F 15/173* (2006.01)
*H04L 29/08* (2006.01)
*H04L 12/26* (2006.01)

(52) U.S. Cl.
CPC .............. *H04L 67/10* (2013.01); *H04L 43/50* (2013.01)

(58) Field of Classification Search
CPC ................................ H04L 67/10; H04L 43/50
See application file for complete search history.

(56) References Cited

U.S. PATENT DOCUMENTS

| | | | | |
|---|---|---|---|---|
| 2005/0038827 A1* | 2/2005 | Hooks | ................. | G06F 11/1451 |
| 2005/0086246 A1* | 4/2005 | Wood | ..................... | G06F 16/21 |
| 2009/0193105 A1* | 7/2009 | Charny | ................... | H04L 45/30 |
| | | | | 709/223 |
| 2013/0132778 A1* | 5/2013 | Dagan | ................... | H04L 41/065 |
| | | | | 714/37 |
| 2014/0047096 A1* | 2/2014 | Kupershmidt | ..... | G06Q 10/0631 |
| | | | | 709/224 |
| 2014/0122559 A1* | 5/2014 | Branson | .................. | H04L 67/02 |
| | | | | 709/201 |
| 2015/0309915 A1* | 10/2015 | Ajith Kumar | ...... | G06F 11/3636 |
| | | | | 717/128 |
| 2016/0080242 A1* | 3/2016 | Grosso | .................... | H04L 12/12 |
| | | | | 370/252 |
| 2016/0285783 A1* | 9/2016 | Uriel | ....................... | H04L 43/16 |

* cited by examiner

*Primary Examiner* — Suraj M Joshi
*Assistant Examiner* — Jaren Means
(74) *Attorney, Agent, or Firm* — Ryan, Mason & Lewis, LLP

(57) ABSTRACT

At least one performance metric is monitored in an information processing system to detect a performance event substantially contemporaneous with the occurrence of the event, wherein monitoring of the performance metric is performed in a continuous manner. At least a portion of the information processing system is profiled in response to detection of a performance event, wherein the profiling step obtains a performance snapshot of the portion of the information processing system being profiled. The performance snapshot is analyzed to determine a root cause of the performance event within the information processing system.

20 Claims, 7 Drawing Sheets

TABLE-1 SHOWS A TYPICAL CONFIGURATION BETWEEN DEGRADATION LEVEL AND PROFILING ACTIONS

| LEVEL | DEVIATION % | PERIOD/TIMES | PROFILING ACTION |
|---|---|---|---|
| #1 | 20% | CONTINUOUS 3 TIMES | PROFILING CACHE-MODULE ONLY ON SPECIFIC TARGET, 5sec |
| #2 | 50% | CONTINUOUS 2 TIMES | PROFILING CACHE-FS-vol (VERTICAL) ON GIVEN TARGET, 10sec |
| #3 | 100% | CONTINUOUS 1 TIMES | PROFILING SYSTEM WIDE (BOTH VERTICAL AND HORIZONAL), 15sec |
| #4 | 200% | CONTINUOUS 1 TIMES | PROFILING SYSTEM WIDE, AND CALL 3$^{rd}$ PARTY (VTune, LTTng) |
| ... | ... | ... | ... |

TABLE-1: CONFIGURABLE DEGRADATION LEVEL AND CORRESPONDING PROFILING ACTIONS

700

800

900

910

1000

US 10,708,344 B1

CONTINUOUS PERFORMANCE MANAGEMENT IN INFORMATION PROCESSING SYSTEMS

FIELD

The field relates generally to information processing systems, and more particularly to performance management in such information processing systems.

BACKGROUND

Information processing systems, such as systems that include cloud computing infrastructure, are complex systems that comprise large numbers of physical and virtualized compute devices, storage devices, network devices, layers, applications, and logic. More specifically, a cloud computing infrastructure is configured to enable ubiquitous, convenient, on-demand network access to a shared pool of configurable computing resources (e.g., networks, servers, storage, applications, and services) that can be rapidly provisioned and released with minimal management effort or service provider interaction.

Although consistent system performance is typically one of the design goals for an information processing system, almost every system suffers unexpected performance degradation. However, getting to the root cause of the performance degradation can be challenging, especially when the information processing system is a production system that is in use by an end-user (e.g., client or customer of a provider of the cloud computing infrastructure).

SUMMARY

Embodiments of the invention provide improved techniques for performance management in information processing systems.

For example, in one embodiment, a method comprises the following steps. At least one performance metric is monitored in an information processing system to detect a performance event substantially contemporaneous with the occurrence of the event, wherein monitoring of the performance metric is performed in a continuous manner. At least a portion of the information processing system is profiled in response to detection of a performance event, wherein the profiling step obtains a performance snapshot of the portion of the information processing system being profiled. The performance snapshot is analyzed to determine a root cause of the performance event within the information processing system.

Advantageously, illustrative embodiments provide system performance management that includes a continuous (e.g., always-on) monitoring approach, an adaptable performance baseline, snapshot-based profiling, and which may accommodate built-in and/or pluggable performance management components. While not limited thereto, illustrative embodiments are particularly well suited for implementation in accordance with information processing systems that are production systems.

These and other illustrative embodiments include, without limitation, apparatus, systems, methods and processor-readable storage media.

BRIEF DESCRIPTION OF THE DRAWINGS

FIG. 6 illustrates configuration degradation levels and corresponding profiling actions, according to an embodiment of the invention.

DETAILED DESCRIPTION

Figure 1:
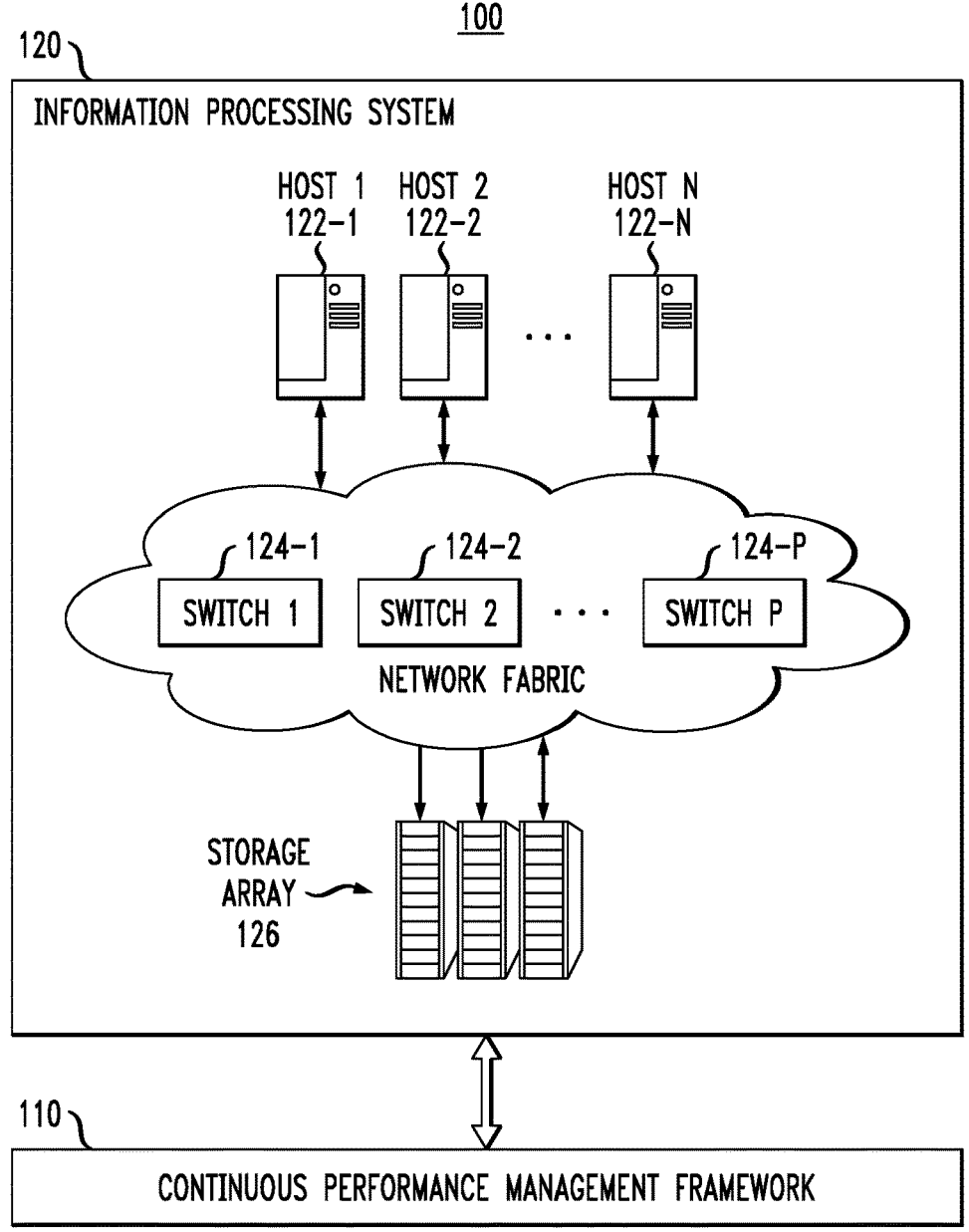
FIG. 1 illustrates a continuous performance management framework environment, according to an embodiment of the invention.

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising cloud computing and storage systems (e.g., cloud computing infrastructure), as well as other types of processing systems comprising various combinations of physical and virtual processing resources. An information processing system may therefore comprise, for example, at least one data center that includes one or more clouds hosting multiple tenants that share cloud resources. The information processing system may also include, for example, private, public or hybrid (part private and part public) cloud computing or storage systems, as well as other types of systems comprising distributed virtual infrastructure. However, a given embodiment may more generally comprise any arrangement of one or more processing devices.

As used herein, the following terms and phrases have the following illustrative meanings: "application" refers to one or more software programs designed to perform one or more functions (e.g., in a data center context, applications are typically tenant defined software programs); "infrastructure" refers to resources that make up and/or support an overall IT (information technology) environment including, but not limited to, computing, storage, and/or network components (including hardware and software implementations); and "snapshot" refers a representation of the state of a system (or parts of the system) at a particular point in time.

As mentioned above, consistent performance usually is one of the system design goals of any information processing system. However, almost every system, especially those built with many components, layers or complex logic, suffers unexpected performance degradation. Typical reasons for such unexpected performance degradatuion include, but are not limited to:

1. Design and/or implementation defect or limitation. In this case, the defect or limitation could be a specific component, i.e., locking, serialization in a key input/output (I/O) path, or more commonly, unexpected interactions between several components, i.e., resource contentions, limited scalability, etc. For example, typical enterprise storage consists of protocol, cache, data reduction (e.g., deduplication, compression), thin provisioning, snapshot, and background services such as re-balance, defragmentation, garbage collection, integrity verification, failure rebuilding, etc. Any single component or interaction between components may impact the system performance as perceived by the end-user.

2. Software (SW) configuration issue. Such SW issues include, but are not limited to, limitations in block size, cache size, queue size, etc.

3. Other hardware (HW) limitations. Such limitations include, but are not limited to, a specific HW component (e.g., NIC/FC port, CPU or disk) reaching an upper limit and becoming a bottleneck, wherein end-to-end performance cannot continue and may degrade, i.e., latency.

Given a specific case, without performing some form of root causing, we do not know the exact root cause of the performance degradation. In general, design limits are more meaningful to detect, but indeed take a large effort. Moreover, many difficult performance issues are discovered during feature integration close to release of the system to a customer, or are reported by a customer when the system is in the production environment (e.g., at customer site). These issues lead to significant pressure to diagnose and fix the problems. For this reason, root causing is the first step and typically the most important step to solving the problems.

The conventional approach to dealing with an unexpected performance degradation in an information processing system involves a long-duration, postmortem process (i.e., not substantially contemporaneous with the occurrence of the performance degradation).

By way of example only, assume that a performance abnormality first occurs in a specific component of the information processing system, i.e., locking at a cache layer. Assume further that such performance degradation that began in the cache layer spreads and finally impacts an application layer such as a database. The database may be impacted such that it runs noticeably slower such that a system administrator takes notice. Typically, the effect on the database can take some time to occur and even longer to be noticed, as measured from the time when the cache layer first began experiencing the locking issue (e.g., dozens of minutes). Following the realization that something is wrong with the system, some diagnostic information is collected by a performance/support engineer. At this point, hours or days may have passed since the issue first happened. Then, a simulation environment may be set up to attempt to reproduce the issue if the issue cannot be resolved quickly after running analytics or if the issue is an issue being reported for the first time. However, to reproduce the problem, it is necessary to have sufficient information about workload and system services status at that moment such as, for a storage system implementation, services for deduplication, compression, re-balancing, verification, etc.

In an unfortunate situation in which the issue cannot be reproduced, and the subject system is a production system, then the infrastructure provider has to go back to ask the customer to provide more information. This course of action does not typically lead to a quick resolution for many reasons. First, performance degradation issues do not happen regularly, so it is not possible to determine when they will happen again. Further, it is not usually clear what the exact trigger situations are for causing the problem, so even the customer may not be able to easily repeat the problem. Still further, it is inconvenient to collect more comprehensive detailed traces from the system due to the concern that such additional diagnostic collection will adversely affect the performance of the production environment by adding diagnostic processing overhead that takes away from the processing capacity of normal operations.

Thus, with regard to conventional approaches, since they cannot capture performance behaviors instantly (or at least substantially contemporaneously) upon occurrence of the degradation and since there is typically a lack of orchestration, the root causing process becomes a manual, iterative process with limitations such as low efficiency, uncertain accuracy and high cost, especially for a production environment and/or for complex issues.

Moreover, for a complex problem, it is difficult to reproduce the problem even by iteratively obtaining more information over several rounds. Each round is based on previous analytics, and hopefully supplements a wider/deeper view. However, such a process may take an uncertain period of time. The biggest issue of such an interactive/best-try approach is that the information is collected far after the first occurrence of the root cause, and it becomes difficult to guarantee the quality of the information and difficult to validate its relationship with the core problem.

Further, due to many manual steps especially in issue detection/confirmation, information retrieval, etc.), the issue cannot be detected early and analyzed quickly. Hence, more resources have to be invested (e.g., at higher cost) in communication, setup, reproduction and repeating for the various diagnostic rounds.

Still further, in theory, the more accurate the insight captured at an early stage, the more confident and efficient the root causing. However, it is infeasible to keep collecting detailed traces all the time, because: unexpected performance degradation is difficult to predict in advance (i.e., it is "unexpected"); and such trace collection adversely affects normal system performance, especially for a production environment.

Accordingly, embodiments of the invention overcome the above and other drawbacks associated with conventional approaches. FIG. 1 illustrates a continuous performance management framework environment 100, according to an embodiment of the invention. As shown, a continuous performance management framework 110 is operatively coupled to an information processing system 120.

Information processing system 120 is illustratively shown to comprise a plurality of host computing devices 122-1, 122-2, . . . , 122-N, a plurality of switches 124-1, 124-2, . . . , 124-P implemented as part of a network fabric (e.g., Fibre Channel fabric), and at least one storage array 126. It is to be appreciated that while the information processing system 120 illustrates certain compute, network and storage components, the system may include additional components not expressly shown. For example, when the system 120 is implemented as part of a distributed virtual infrastructure, each host may have associated therewith one or more virtual machines (VMs), while each storage array may have associated therewith one or more logical units (LUNs). The system 120 may also include layers of protocols, caches, file systems, and block storage volumes. Thus, the system can have both logical components and physical components. Also, it is to be understood that each storage array may have one or more physical storage devices associated therewith.

Continuous performance management framework 110, as will be illustratively explained in the context of FIGS. 2-10, provides improved techniques for performance management in information processing systems. The framework 110 provides many features and advantages that overcome the drawbacks associated with conventional approaches.

By way of example only, framework 110 provides event-driven modeling and handling, as well as an adaptive baseline. That is, framework 110 treats performance degradation as a series of continuous events, each of which is identified by its performance change over a dynamically adjusted baseline. Baseline as referred to in accordance with embodiments of the invention is not quality-of-service (guarantee to customer) but rather a reasonable approximation of system capability, and it is self-adaptive to cover any hardware, workload and system interaction change over time. Also, degradation detection in accordance with illustrative embodiments exhibits a minimum footprint with respect to both memory and central processing unit (CPU) resources and, as such, can be always-on (continuous monitoring) which is important especially for a production system.

Framework 110 also profiles parts or all of information processing system 120 via a system performance insight snapshot. Such snapshots are in the form of performance traces that are captured substantially contemporaneously with the early symptoms of the performance degradation. Illustrative embodiments provide an incremental profiling approach. That is, the more serious the performance degradation, the deeper and wider the traces are collected, thus carefully controlling the profiling overhead. The traces together with other relevant status information function as a snapshot for the given time instance, and the series of traces (snaps) are ordered by timestamp which provides a comprehensive view of the issue.

Framework 110 provides an automated, well-orchestrated framework through degradation event detection, incremental profiling, upload, correlation and analytics. The framework 110, as will be further explained, supports existing built-in profiling/analytics utilities, as well as third party (if installed) or newly built tools. The automation provided by framework 110 greatly improves the efficiency and lowers the cost of the overall root causing task.

Figure 2:
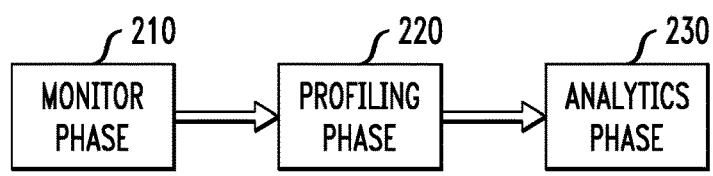
FIG. 2 illustrates phases of a continuous performance management framework, according to an embodiment of the invention.
Figure 3:
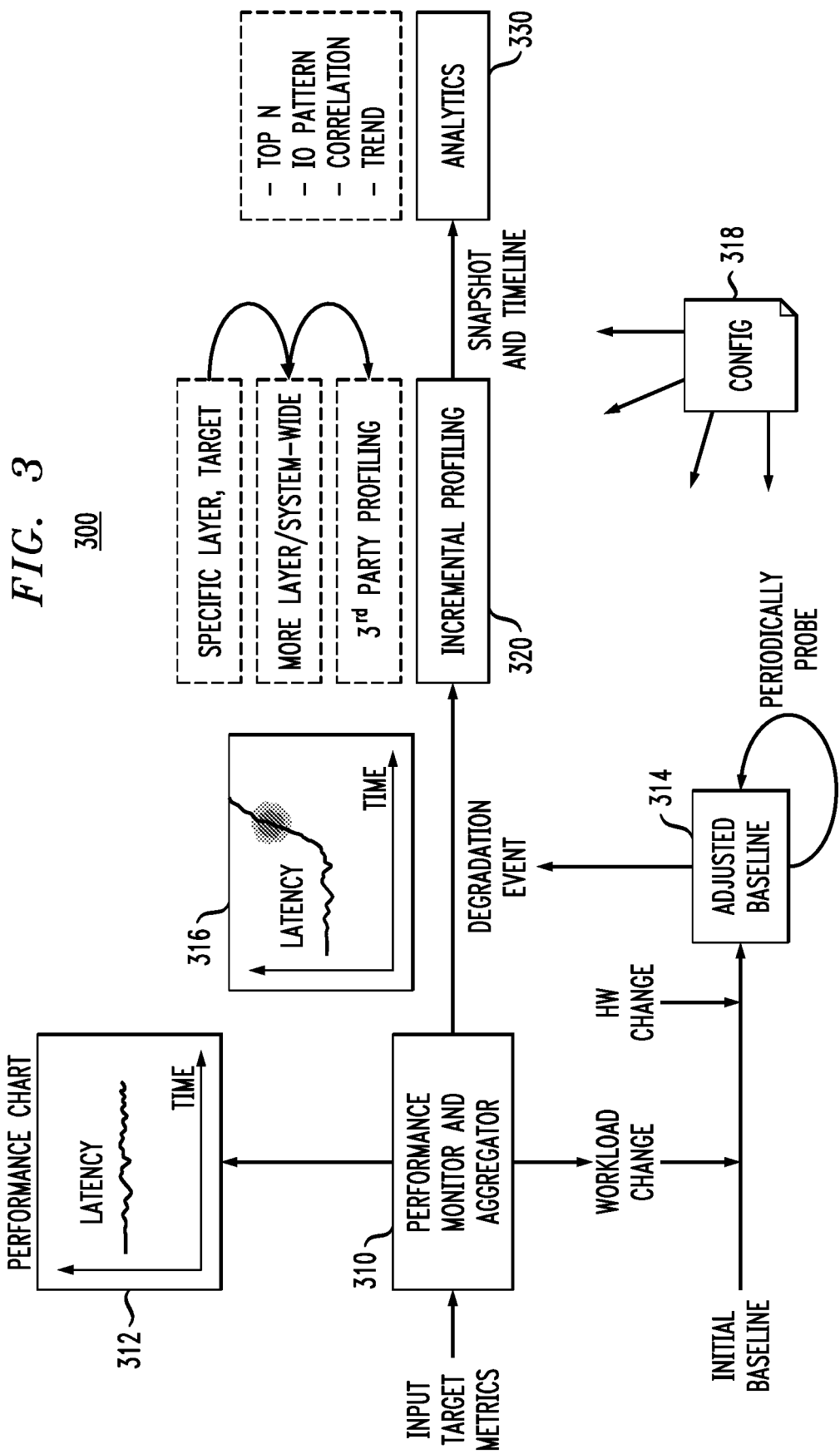
FIG. 3 illustrates further details of phases of a continuous performance management framework, according to an embodiment of the invention.
Figure 4:
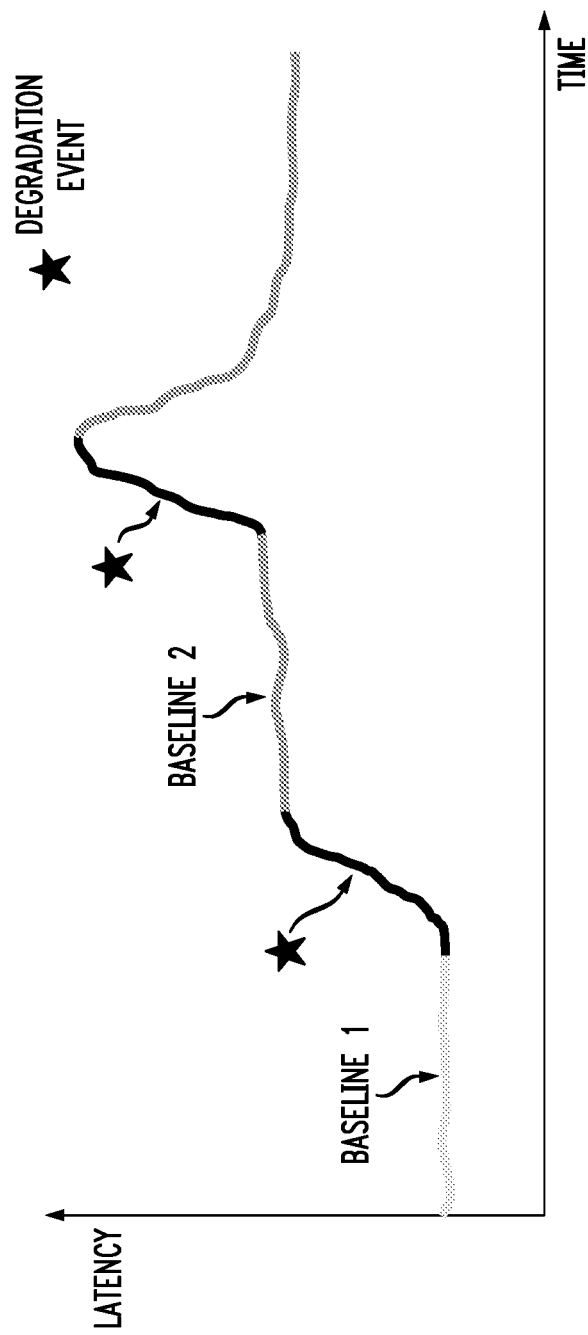
FIG. 4 illustrates an adaptive performance baseline, according to an embodiment of the invention.

FIG. 2 illustrates main phases of a continuous performance management framework 110. As shown in methodology 200, framework 110 provides a monitor phase 210, a profiling phase 220, and an analytics phase 230. In illustrative embodiments, these phases are run separately (e.g., at substantially none overlapping times to the extent possible) so as to minimize the overhead on the CPU and memory resources of the information processing system 120 on which parts of or all of framework 110 are implemented. FIG. 3 illustrates further details of each phase of the monitor phase 210, the profiling phase 220, and the analytics phase 230 of the continuous performance management framework 110.

As shown in the monitor phase of system 300 in FIG. 3, a lightweight, performance monitor and aggregator module 310 continuously monitors one or more user-specified performance metrics of some target(s) in the system 120 to detect any early symptoms of performance degradation. The module 310 is always-on with minimal running overhead in terms of CPU and memory. A user can input one or more watch targets and one or more performance metrics. Typical visible output is a performance chart 312 showing statistics over some time period (5 seconds, 10 seconds, 1 minute, etc.) for some metric (e.g., IOPS (input/output per second), latency, bandwidth, etc.).

It is to be appreciated that the monitor target input by the user (or by default system-wide) can be one or more components of the information processing system (e.g., one or more specific file systems (FS), volumes, storage pools, or VMs/containers). The performance metric input by the user may be IOPS, latency, bandwidth, read request, write request, or arbitrary combinations thereof, i.e., write latency on volumes 1, 2, and 3.

Note that the baseline, as mentioned above, is a guidance to indicate normal system performance capability on a specific metric. Further, baseline in our context is not QoS, instead it is defined as a stable performance so as to reasonably distinguish normal performance and abnormal performance (including better and worse performance) over a given execution period, see, e.g., graph 400 in FIG. 4.

In accordance with embodiments of the invention, the baseline can be dynamically changed to yield an adjusted baseline. The change may be due to expected reasons and/or unexpected reasons such as, by way of example only: (i) an increase or decrease (including failure) of some HW resources, e.g., CPU, memory, disk, network cards, etc.; (ii) workload changes, e.g., more or less clients, threads, requests, or types get changed in read/write ratio, I/O size, I/O pattern, etc.; and (iii) systems design/implementation defect or limitation such as, by way of example only, a bottleneck or limited scalability, etc., wherein the system does not behave as it should (since HW limit has not been reached) and the customer has complained.

An initial baseline may be input by the user, however, due to one or more of the above reasons, the customer (user) may not be fully aware of what a reasonable capability of the system should be. Thus, one or more embodiments adjust an initial baseline using a built-in, adjusted baseline module 314.

Monitor 310 also has a performance aggregation function (aggregator) whereby performance statistics are aggregated per target (e.g., per FS1 or volume 1) over a given time interval. A limited number of statistics remain in memory and consume only a limited number of bytes, thus keeping CPU and memory footprints to a minimum. The aggregator in module 310 keeps running (always-on) to output the statistics (e.g., for performance chart 312) for viewing by the user, and meanwhile to monitor and mark any notable performance degradation events (e.g., as illustrated by graph 316 in FIG. 3) based on the aggregated performance data and baseline. A typical aggregator metric for a storage system could be: {Read block size, write block size, read latency, write latency, read IOPs, write IOPS}*{3 seconds, 30 seconds, 1 minute, 10 minutes, 30 minutes}*{Average, Maximum, Base}. This example represents 90 metrics per target. If each metric consumes 4 bytes, that totals 360 bytes, wherein most operations are simple mathematical operations.

As further shown in FIG. 3, any notable performance change, either better or worse as compared to the most recent baseline 314, is considered as a performance event that calls for interpretation. In practice, the system focuses on performance degradation events, see, e.g., graph 400 in FIG. 4. However, performance improvement events (where current performance values are better than the baseline) can be profiled and analyzed in a similar manner. A definition of a performance event considers several influential factors and reasonably balances between accuracy, sensitivity, handling overhead, and considers factors such as granularity, minimum degradation, time intervals, etc. In one example, a definition of performance degradation comprises a 4-element tuple, i.e., a degradation event is defined as {Fact, Acts, Deviation, Times} where:

"Fact" element represents most recent (3-5 seconds) aggregated statistics reflecting ongoing status;

"Acts" element represents whether the current value of the performance metric is better or worse than the baseline;

"Deviation" element represents the extent in percentage that the "Fact" element deviates from the baseline. In one embodiment, the baseline could be the most recent adjusted baseline, or combined with another adjacent statistic with a configurable weight, such as {baseline*70%+recent-60sec-stats*30%}.

"Times" element represents time interval in which to confirm the above deviation, e.g., 30 seconds or two times.

It is realized that there may be a trade-off regarding the sampling granularity in the monitor phase. Fine granularity (e.g., as low as 1 second) would be sensitive enough to detect ephemeral performance fluctuation. On the other hand, such a fine granularity would likely cause more overhead and performance impact. In contrast, coarse granularity may miss ephemeral performance changes (or profile the normal insights unnecessarily due to a delay) but cause the least performance impact. Thus, illustrative embodiments determine system load pressure and, in lightweight system load, the framework uses a fine-grain sampling, otherwise the framework uses a coarse-grain sampling. Framework 110 thus offers a configurable option, i.e., the default granularity of 3 seconds for most cases, which could be adjusted in real time. As a result, overall performance change is detected and reacted to in a few seconds. An example of a complete sample is as follows: (most recent 3 second write latency) gets 20% worse than [recent-base*70%+recent 10 minute average performance*30%] for 2 times.

Performance change has various levels (configurable) in terms of percentages and periods, e.g., such as 10%, 30%, 100% worse than base, or repeat for 1 minute, etc. Different levels map to different grades of actions, as will be evident from the profiling and analytics phases described below.

As mentioned above, reasonably and dynamically tracking a stable baseline is important to detecting and marking any abnormal system performance. Illustrative embodiments provide a self-adaptive approach to continuously characterize normal system capability, and deal with typical variables such as HW change, workload change, changes over time, etc., as illustrated in graph 500 of FIG. 5A.

A customer may input an initial baseline based on his/her knowledge of the system, i.e., 2 milliseconds on volume 1, 10K TOPS on volume 2. Note that this user input is not the final accepted baseline but merely a reference. The baseline adaptive module 314 periodically detects and adjusts system capabilities. Detection could be triggered when one or more of the following occurs: (i) HW change (e.g., increase or decrease in memory, disks, network card, etc.); (ii) a notable workload change detected by aggregator module over the given periods, e.g., read request account in recent 5 seconds is 50% more than in the past 30 seconds; or 10 size changes, etc. (iii) probe the performance at boot up or volume/FS mount; such as construct read/write requests (according to recent performance statistics information) on existing data (or a pre-defined area that is not visible to users), then collect performance information; and (iv) a configurable regular period such as every 2 hours.

The final baseline, in one embodiment, combines the latest probe results and recent statistics with various weights, for example "recent probe performance" with weight 70%, and "recent 10 minute average performance statistic" with weight 30%. Such adjusted baseline is shown to the user so that the user is made aware of the adjustment.

Figure 5A:
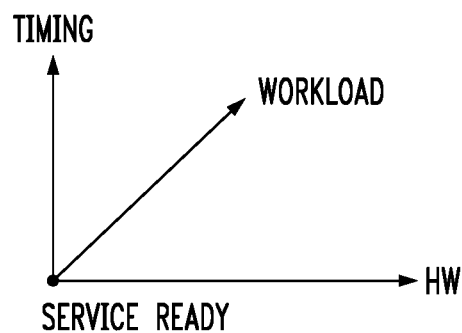
FIGS. 5A and 5B illustrate impact variables and adjustment of a performance baseline, according to an embodiment of the invention.
Figure 5B:
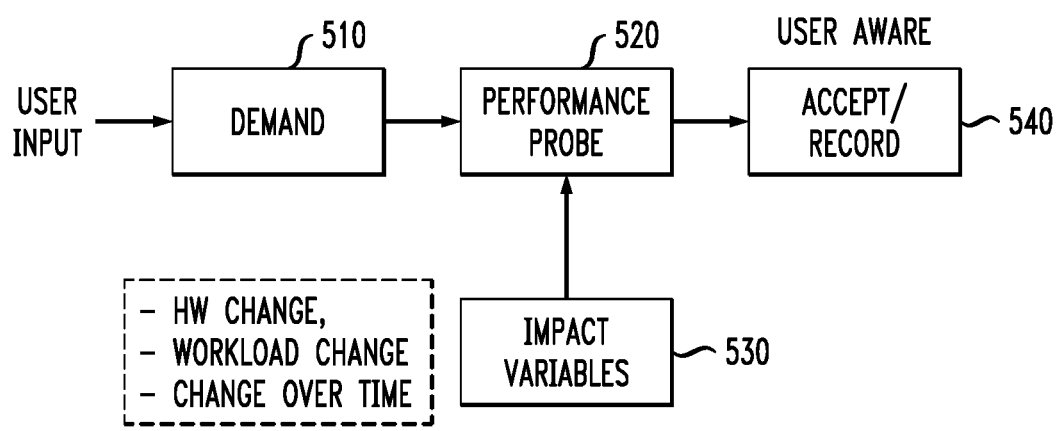

An illustrative embodiment of this self-adaptive approach is shown in FIG. 5B. The user inputs an initial baseline as demand 510. The system is probed in step 520 based on this baseline, and an adjusted baseline is determined taking into account impact variables 530 (e.g., HW change, workload change, change over time, etc.). The adjusted baseline is accepted by the user and recorded in step 540.

Returning to FIG. 3, following the monitoring phase, an incremental profiling phase 320 is performed. That is, once a performance degradation event is identified by the monitor module, a corresponding profiling action is taken based on the determined downgrade level to capture system internal performance behaviors and insights. Examples of configurable degradation levels and corresponding profiling actions are shown in table 600 in FIG. 6. Profiling target(s) can be specific entities (e.g., in vertical profiling: volume, FS, VM, etc.), or components (in horizontal profiling: cache, FS, block, etc. . . . ), or the entire information processing system (system-wide) depending on the determined degradation level. The output format of the profiling is dependent on the profiling target.

The profiling task can be performed by specific utilities, either built-in (e.g., part of information processing system) or plug-in (e.g., remote from the information processing system but having access thereto), such as, but not limited to: (i) existing system built-in profiling such as JTrace for VNX/VNXe; (ii) third party tools such as: Windows Xperf, Intel VTune, Linux OProfile, Linux LTTng, Java Jprofile, etc.; (iii) newly-built profiling that can support following a vertical-horizontal orthogonal mechanism such as will be further explained below.

Figure 7:
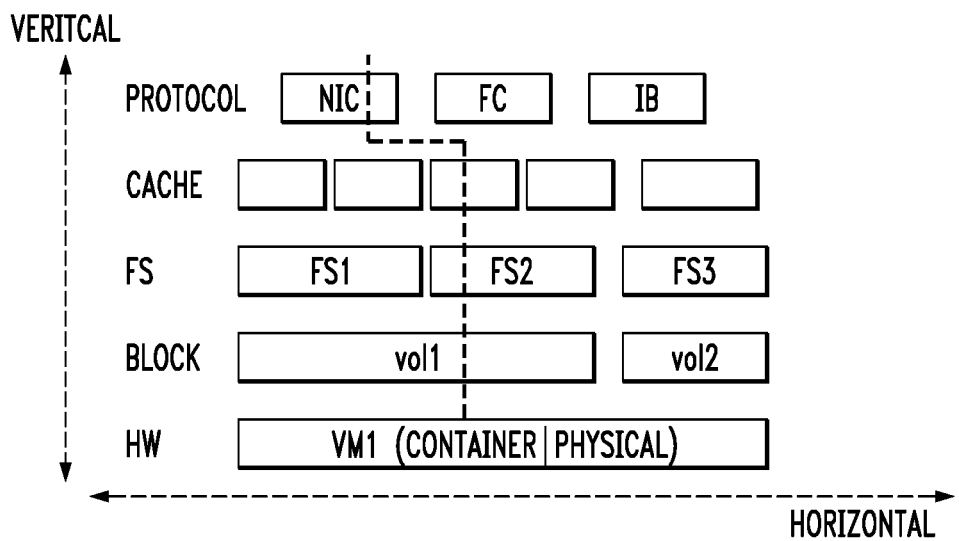
FIG. 7 illustrates examples of vertical and horizontal profiling, according to an embodiment of the invention.

Existing profiling can be plugged into the framework 110 with minimum integration effort. However, the plug-in profiling tool should minimize system impact on CPU and memory resource usage. FIG. 7 shows an example of a profiling stack 700 according to an illustrative embodiment. The stack includes both horizontal profiling and vertical profiling approaches.

As shown for horizontal profiling, once enabled at a block layer, by way of example, then all volumes in the given block layer (e.g., volume 1, volume 2, etc.) are traced, no matter their upper serving targets (FS1 or FS2) or lower backing layers.

As shown for vertical profiling, once enabled, all layers in a vertical direction start tracing on the specific target only and ignore other targets. For example, once enabled for an approach referred to as "FS2.vertical," the profiling operation collects information (traces) from cache, FS2, volume 1, etc., but no traces are collected for FS2, volume 2.

In one embodiment, the system enables vertical profiling at first with quick sorting or a reference baseline, and then focus on a specific layer for detailed horizontal profiling.

Figure 8:
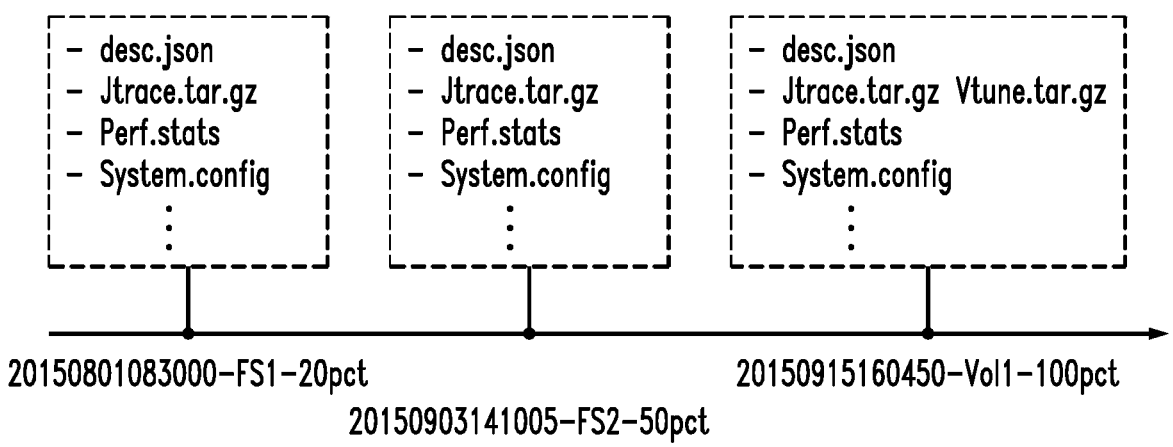
FIG. 8 illustrates a profiling snapshot and timeline, according to an embodiment of the invention.

FIG. 8 illustrates an illustrative profiling output as a performance insight snapshot 800. In general, performance traces are collected in memory at first, then stored to a specific disk store. The final output also includes a description JSON (JavaScript Object Notation) file for relevant event information and profiling information, the trace files (i.e., Jtrace, Vtune, LTTng), recent performance aggregated statistics, and relevant system configuration information (available to components in system 300 via configuration file 318). The profiling output acts as the insight snapshot of performance behaviors. Multiple snapshots are ordered by timestamp (in different sub-directory per pre-defined naming rules such as timestamp-target-degradation).

Returning to FIG. 3, following the profiling phase, an analytics phase 330 is performed. That is, once the above-described performance snapshot is collected, the one or more profiling snapshots can be automatically uploaded to another specified store (such as, for example, a separate host, a local support center, or even to a dedicated cloud). Once uploaded, offline analytics can be run on the snapshots. Examples of analytics include, but are not limited to: (i) top N overhead contributors per given target (for <30% degrade), or system wide (>30%); (ii) I/O request pattern i.e., size, read/write ratio, distribution pattern; (iii) correlation between various layers/components, i.e., between cache to FS/volume; (iv) over time, enough historical performance snapshot logs can be the source for a visualization and trend analytics report.

Figure 9A:
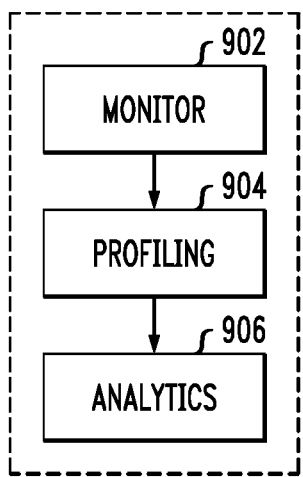
FIG. 9A illustrates continuous performance management in a fully built-in framework, according to an embodiment of the invention.
Figure 9B:
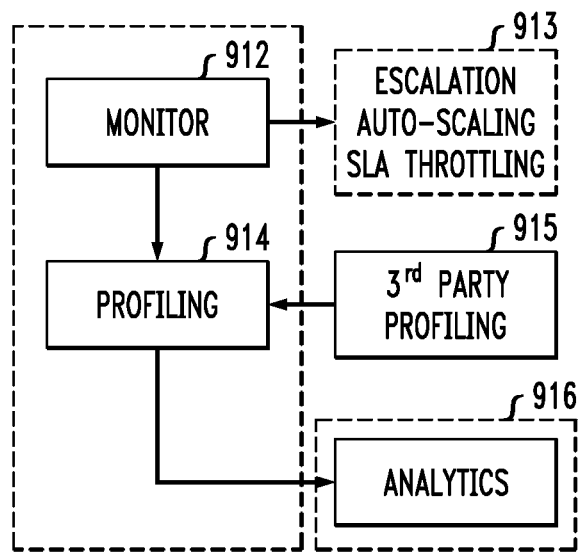
FIG. 9B illustrates continuous performance management in a partially built-in and partially plug-in framework, according to an embodiment of the invention.

FIG. 9A illustrates continuous performance management in a fully built-in framework 900, while FIG. 9B illustrates continuous performance management in a partially built-in and partially plug-in framework 910. In framework 900, the monitoring phase 902, the profiling phase 904, and the analytics phase 906 are all implemented within (built-in) the information processing system 120. In contrast, in framework 910, one or more of the monitoring phase 912, the profiling phase 914, and the analytics phase 916 may have all or parts of their operations implemented remote (plug-in) from the information processing system 120, resulting in a "built-in+plug-in" framework.

For example, in one built-in+plug-in framework implementation, monitoring and profiling functions are built-in to the system such as VNX/VMAX (some profiling could be plug-in or may work remotely), while an analytics module and other plug-in functions are implemented out of the system 120, such as a cloud in ViPR Storage Resource Management or Storage Analytics, which are products commercially available from EMC Corporation (Hopkinton, Mass.). This provides a balance between efficiency and system impact. Further, as shown in framework 910, critical degradation may trigger auto-scaling, throttling, and/or an escalation module if configured to do so.

As illustratively described herein, continuous performance management framework 110 effectively manages performance degradation using detection, profiling, and analytics for quick and efficient root-causing. The framework minimizes running overhead and is always-on even for a production system. Separated monitoring and profiling phases, along with profiling being performed in incremental way, minimizes the execution footprint thus making the framework feasible for a production system.

Figure 10:
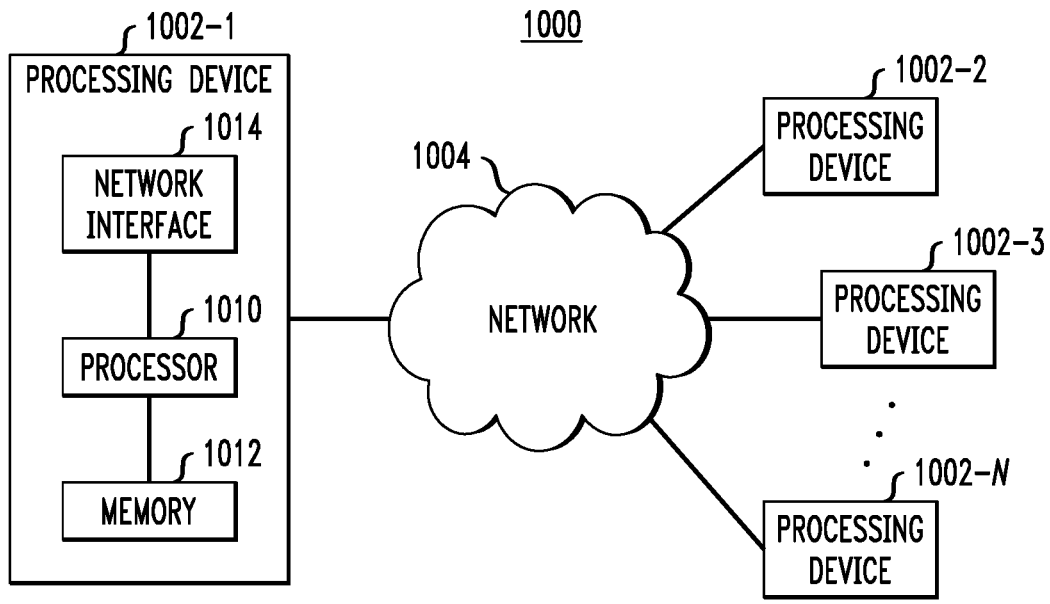
FIG. 10 illustrates a processing platform used to implement a continuous performance management framework, according to an embodiment of the invention.

As an example of a processing platform on which a continuous performance management framework (as shown in FIGS. 1-9B) according to illustrative embodiments can be implemented is processing platform 1000 shown in FIG. 10. The processing platform 1000 in this embodiment comprises a plurality of processing devices, denoted 1002-1, 1002-2, 1002-3, . . . 1002-N, which communicate with one another over a network 1004. It is to be appreciated that the continuous performance management methodologies described herein may be executed in one such processing device 1002, or executed in a distributed manner across two or more such processing devices 1002. Thus, the framework environment may be executed in a distributed manner across two or more such processing devices 1002. The various functionalities described herein may be executed on the same processing devices, separate processing devices, or some combination of separate and the same (overlapping) processing devices. It is to be further appreciated that a server, a client device, a computing device or any other processing platform element may be viewed as an example of what is more generally referred to herein as a "processing device." As illustrated in FIG. 10, such a device comprises at least one processor and an associated memory, and implements one or more functional modules for instantiating and/or controlling features of systems and methodologies described herein. Multiple elements or modules may be implemented by a single processing device in a given embodiment.

The processing device 1002-1 in the processing platform 1000 comprises a processor 1010 coupled to a memory 1012. The processor 1010 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 1010. Memory 1012 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 1012 may comprise electronic memory such as random access memory (RAM), read-only memory (ROM) or other types of memory, in any combination. The one or more software programs when executed by a processing device, such as the processing device 1002-1, causes the device to perform functions associated with one or more of the components/steps of system/methodologies in FIGS. 1-9B. One skilled in the art would be readily able to implement such software given the teachings provided herein. Other examples of processor-readable storage media embodying embodiments of the invention may include, for example, optical or magnetic disks.

Processing device 1002-1 also includes network interface circuitry 1014, which is used to interface the device with the network 1004 and other system components. Such circuitry may comprise conventional transceivers of a type well known in the art.

The other processing devices 1002 (1002-2, 1002-3, . . . 1002-N) of the processing platform 1000 are assumed to be configured in a manner similar to that shown for computing device 1002-1 in the figure.

The processing platform 1000 shown in FIG. 10 may comprise additional known components such as batch processing systems, parallel processing systems, physical machines, virtual machines, virtual switches, storage volumes, etc. Again, the particular processing platform shown in this figure is presented by way of example only, and the data valuation system and cloud infrastructure described herein may include additional or alternative processing platforms, as well as numerous distinct processing platforms in any combination.

Also, numerous other arrangements of servers, clients, computers, storage devices or other components are possible in processing platform 1000. Such components can communicate with other elements of the processing platform 1000 over any type of network, such as a wide area network (WAN), a local area network (LAN), a satellite network, a telephone or cable network, or various portions or combinations of these and other types of networks.

Furthermore, it is to be appreciated that the processing platform 1000 of FIG. 10 can comprise virtual machines (VMs) implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 1000 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

An example of a commercially available hypervisor platform that may be used to implement portions of the processing platform 1000 in one or more embodiments of the invention is the VMware vSphere (VMware Inc. of Palo Alto, Calif.) which may have an associated virtual infrastructure management system such as the VMware vCenter. The underlying physical infrastructure may comprise one or more distributed processing platforms that include storage products such as VNX and Symmetrix VMAX (both available from EMC Corporation of Hopkinton, Mass.). A variety of other computing and storage products may be utilized to implement the one or more cloud services that provide the functionality and features described herein.

It was noted above that portions of the continuous performance management framework environment may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
    monitoring at least one performance metric in an information processing system to detect a performance event substantially contemporaneous with the occurrence of the event, wherein the monitoring of the at least one performance metric is performed in a continuous manner;
    wherein the performance event is detected based at least in part on whether a current value of the at least one performance metric deviates from a baseline for the at least one performance metric and an amount that the current value deviates from the baseline, and wherein the current value is determined based on an aggregation of values collected for the at least one performance metric over a given time interval;
    profiling at least a portion of the information processing system in response to the detection of the performance event, wherein the profiling step comprises obtaining a performance snapshot of the portion of the information processing system being profiled;
    analyzing the performance snapshot to determine a root cause of the performance event within the information processing system; and
    determining a load pressure of the information processing system and, based on the determined load pressure, configuring a sensitivity of a sampling granularity of the information processing system;
    wherein the performance event is represented by a tuple comprising a plurality of elements comprising a first element representing the aggregation of values for the at least one performance metric over the given time interval, a second element representing whether the current value is better or worse than the baseline, a third element representing the percentage that the current value deviates from the baseline and a contemporaneous performance statistic with a configurable weight, and a fourth element representing a time interval in which to confirm the amount that the current value deviates from the baseline;
    wherein the profiling step is incremental as determined by a severity of the performance event;
    wherein the profiling step further comprises profiling one or more components of the information processing system based on the performance event;
    wherein a number of the one or more components of the information processing system being profiled incrementally increases as the severity of the performance event increases;
    wherein a sensitivity of the sampling granularity increases to a fine-granularity to detect ephemeral performance fluctuations in response to a determination of a decrease in the load pressure;
    wherein, following the increase to the fine-granularity, the sensitivity of the sampling granularity decreases to a coarse-granularity in response to a determination of an increase in the load pressure; and
    wherein the monitoring, profiling, analyzing, and determining steps are performed by a processing device comprising a processor operatively coupled to a memory.

2. The method of claim 1, wherein the monitoring step further comprises adapting the baseline in response to detecting a change associated with one or more capabilities of the information processing system.

3. The method of claim 2, wherein the change associated with one or more capabilities of the information processing system comprises at least one of: a hardware change in the information processing system; a change to a workload being executed by the information processing system; a change over time; detection of a defect in at least one of a design and an implementation of the information processing system; a performance probe executed at boot up of the information processing system.

4. The method of claim 1, wherein the profiling step further comprises profiling the entire information processing system based on the performance event.

5. The method of claim 1, wherein the profiling step further comprises performing at least one of a built-in profiling operation and a plug-in profiling operation.

6. The method of claim 1, wherein the profiling step further comprises at least one of:
performing a horizontal profiling operation on components of one layer of the information processing system; and
performing a vertical profiling operation on components across two of more layers of the information processing system.

7. The method of claim 1, wherein the profiling step further comprises collecting performance traces to obtain the performance snapshot, and wherein the performance traces are collected based on the severity of the performance event.

8. The method of claim 1, wherein the analyzing step further comprises performing analytics on the information processing system.

9. The method of claim 8, wherein the analytics are performed at least one of: within the information processing system; and remote from the information processing system.

10. The method of claim 8, wherein the analytics comprise at least one of built-in analytics and plug-in analytics.

11. The method of claim 8, wherein the analytics comprise one or more of: determining top N contributors to the performance event in the information processing system; determining input/output patterns associated with the performance event in the information processing system; and correlating components associated with the performance event within the information processing system.

12. The method of claim 1, wherein the information processing system comprises a cloud computing infrastructure.

13. The method of claim 1, wherein the analyzing step further comprises performing analytics on the information processing system, and wherein the analytics comprise determining top N contributors to the performance event in the information processing system.

14. A system comprising:
a memory; and
a processor operatively coupled to the memory and configured to:
monitor at least one performance metric in an information processing system to detect a performance event substantially contemporaneous with the occurrence of the event, wherein the monitoring of the at least one performance metric is performed in a continuous manner;
wherein the performance event is detected based at least in part on whether a current value of the at least one performance metric deviates from a baseline for the at least one performance metric and an amount that the current value deviates from the baseline, and wherein the current value is determined based on an aggregation of values collected for the at least one performance metric over a given time interval;
profile at least a portion of the information processing system in response to the detection of the performance event, wherein, in performing the profiling, the processor is configured to obtain a performance snapshot of the portion of the information processing system being profiled;
analyze the performance snapshot to determine a root cause of the performance event within the information processing system; and
determine a load pressure of the information processing system and, based on the determined load pressure, configure a sensitivity of a sampling granularity of the information processing system;
wherein the performance event is represented by a tuple comprising a plurality of elements comprising a first element representing the aggregation of values for the at least one performance metric over the given time interval, a second element representing whether the current value is better or worse than the baseline, a third element representing the percentage that the current value deviates from the baseline and a contemporaneous performance statistic with a configurable weight, and a fourth element representing a time interval in which to confirm the amount that the current value deviates from the baseline;
wherein the profiling is incremental as determined by a severity of the performance event;
wherein, in performing the profiling, the processor is further configured to profile one or more components of the information processing system based on the performance event;
wherein a number of the one or more components of the information processing system being profiled incrementally increases as the severity of the performance event increases;
wherein a sensitivity of the sampling granularity increases to a fine-granularity to detect ephemeral performance fluctuations in response to a determination of a decrease in the load pressure; and
wherein, following the increase to the fine-granularity, the sensitivity of the sampling granularity decreases to a coarse-granularity in response to a determination of an increase in the load pressure.

15. The system of claim 14, wherein the processor is further configured to adapt the baseline in response to detecting a change associated with one or more capabilities of the information processing system.

16. The system of claim 15, wherein the change associated with one or more capabilities of the information processing system comprises at least one of: a hardware change in the information processing system; a change to a workload being executed by the information processing system; a change over time; detection of a defect in at least one of a design and an implementation of the information processing system; a performance probe executed at boot up of the information processing system.

17. The system of claim 14, wherein the information processing system comprises a cloud computing infrastructure.

18. The method of claim 14, wherein, in analyzing the performance snapshot, the processor is further configured to perform analytics on the information processing system, and wherein the analytics comprise determining top N contributors to the performance event in the information processing system.

19. An article of manufacture comprising a processor-readable non-transitory storage medium having encoded therein executable code of one or more software programs, wherein the one or more software programs when executed by one or more processing devices implement steps of:
monitoring at least one performance metric in an information processing system to detect a performance event substantially contemporaneous with the occurrence of the event, wherein the monitoring of the at least one performance metric is performed in a continuous manner;
wherein the performance event is detected based at least in part on whether a current value of the at least one performance metric deviates from a baseline for the at least one performance metric and an amount that the current value deviates from the baseline, and wherein the current value is determined based on an aggregation of values collected for the at least one performance metric over a given time interval;
profiling at least a portion of the information processing system in response to the detection of the performance event, wherein the profiling step comprises obtaining a performance snapshot of the portion of the information processing system being profiled;
analyzing the performance snapshot to determine a root cause of the performance event within the information processing system; and
determining a load pressure of the information processing system and, based on the determined load pressure, configuring a sensitivity of a sampling granularity of the information processing system;
wherein the performance event is represented by a tuple comprising a plurality of elements comprising a first element representing the aggregation of values for the at least one performance metric over the given time interval, a second element representing whether the current value is better or worse than the baseline, a third element representing the percentage that the current value deviates from the baseline and a contemporaneous performance statistic with a configurable weight, and a fourth element representing a time interval in which to confirm the amount that the current value deviates from the baseline;
wherein the profiling step is incremental as determined by a severity of the performance event;
wherein the profiling step further comprises profiling one or more components of the information processing system based on the performance event;
wherein a number of the one or more components of the information processing system being profiled incrementally increases as the severity of the performance event increases;
wherein a sensitivity of the sampling granularity increases to a fine-granularity to detect ephemeral performance fluctuations in response to a determination of a decrease in the load pressure; and
wherein, following the increase to the fine-granularity, the sensitivity of the sampling granularity decreases to a coarse-granularity in response to a determination of an increase in the load pressure.

20. The article of manufacture of claim 19, wherein the analyzing step further comprises performing analytics on the information processing system, and wherein the analytics comprise determining top N contributors to the performance event in the information processing system.

* * * * *